March 3, 1964 R. R. GUNDERSON 3,123,041
FOLDABLE WARNING SIGNAL
Filed Sept. 13, 1961 2 Sheets-Sheet 1

Inventor:
Ralph R. Gunderson
By: Hofgren, Brady, Wegner,
Allen & Stellman
Attorneys March 3, 1964 R. R. GUNDERSON 3,123,041
FOLDABLE WARNING SIGNAL
Filed Sept. 13, 1961 2 Sheets-Sheet 2
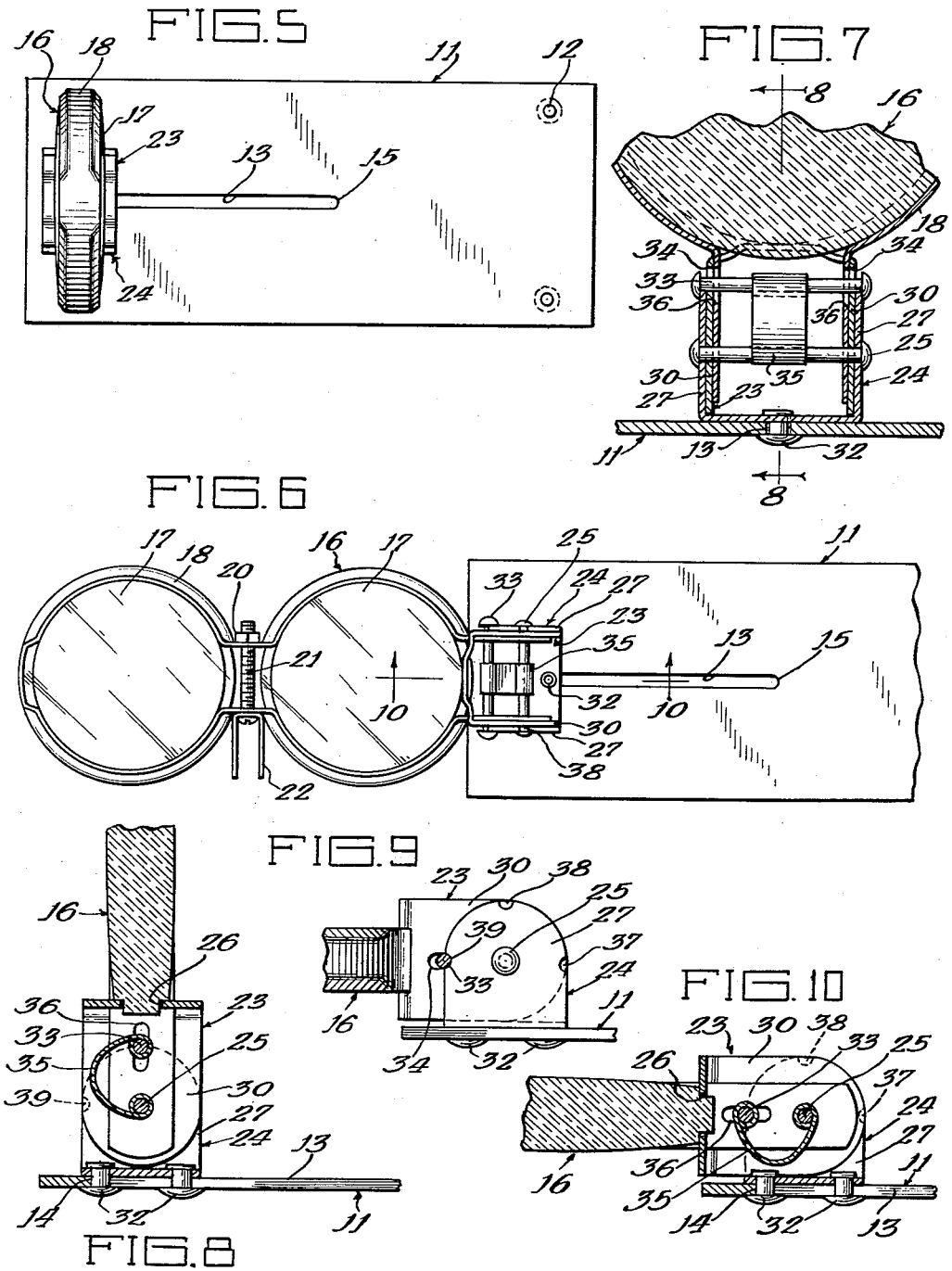

United States Patent Office 3,123,041
Patented Mar. 3, 1964

3,123,041
FOLDABLE WARNING SIGNAL
Ralph R. Gunderson, 5520 South Shore Drive,
Chicago, Ill.
Filed Sept. 13, 1961, Ser. No. 137,812
9 Claims. (Cl. 116—63)

This invention relates to a highway warning signal and more particularly to a new and novel latching means for a foldable highway warning signal.

Foldable highway warning signals are commonly carried by truck and other vehicular traffic and are used to warn approaching vehicles of the existence of obstructions or other emergency conditions.

The primary object of the present invention is to provide a new and novel latching means for a foldable highway warning signal.

Another object is to provide a latching structure for such a warning signal which will enable the signal to be employed with a substantially planar metal base.

A further object is to provide a unique manner for anchoring the free end portions of the bezel embracing the reflecting lenses, at the same time avoiding interference with the latching structure.

Still another object is to provide a warning signal having a hinged portion capable of longitudinal movement relative to the base member to enable the warning signal to be mounted centrally of the base when in upright position while permitting the warning signal to be swung downwardly to closed position over the base member.

A still further object is to provide an improved warning signal capable of being latched in any one of two operative positions and to provide a base member adapted to be embedded in mud and snow when the signaling device is in the forward extended position.

The invention is illustrated in the preferred embodiment of the accompanying drawings, in which:

FIG. 5 is a top plan view of the warning signal of FIG. 4;

FIG. 6 is a fragmentary top plan view of the warning signal with the signal device in forward extended position;

FIG. 7 is a fragmentary enlarged sectional view taken as indicated on line 7—7 of FIG. 3;

FIG. 8 is a sectional view taken as indicated on line 8—8 of FIG. 7;

FIG. 9 is a fragmentary side elevational view on an enlarged scale of the warning signal showing the latching structure swung to forward extended position as seen in FIG. 6; and FIG. 10 is a fragmentary sectional view on an enlarged scale taken as indicated on line 10—10 of FIG. 6.

In the embodiment illustrated, a supporting base, indicated generally at 11, comprises preferably a flat piece of sheet metal of relatively heavy gauge having a number of rubber mounting feet 12 positioned thereon. The supporting base 11 is preferably provided with a longitudinally extending slot 13 extending from a point adjacent the front end portion of the base 11 at 14 (FIG. 8) to a point indicated at 15 (FIG. 5) substantially centrally thereof. The function of the slot 13 will later be made more apparent.

Figure 1:
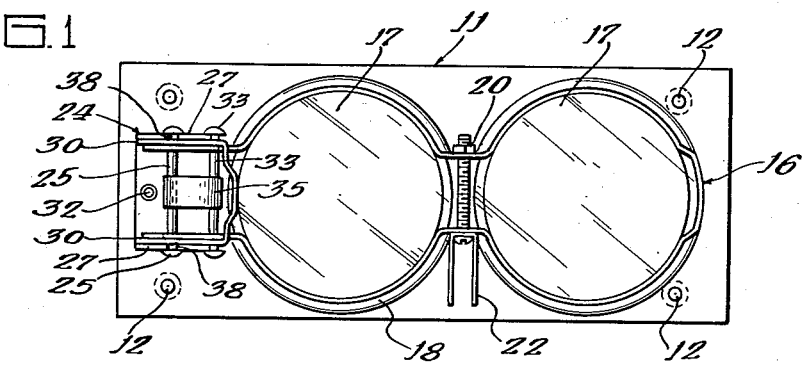
FIG. 1 is a top plan view of a warning signal with the signal device in closed position.
Figure 3:
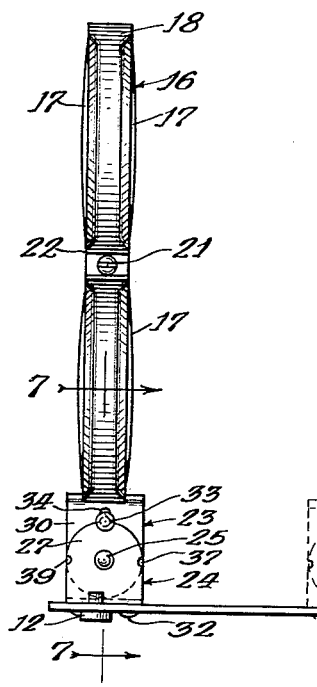
FIG. 3 is a side elevational view of the warning signal with the signal device swung to upright latched position, the signal device also being shown in dotted outline after having been moved centrally of the base.
Figure 4:
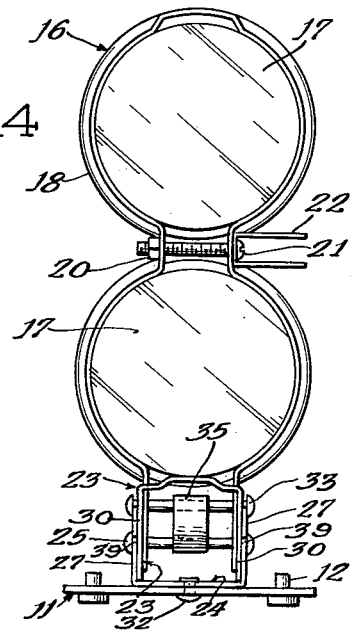
FIG. 4 is a front elevational view of the warning signal taken from the left of FIG. 3.

A conventional warning signal device, indicated generally at 16, may be swingably connected to the base 11 for movement from an inoperative position (FIG. 1) to one or more operative positions (FIGS. 3, 4 and 6). The signal device 16 includes two pairs of light reflecting lenses 17 positioned so that each of the pairs has its light reflecting surfaces facing outwardly. A bezel 18 is provided for holding the lenses 17 in assemblied relation one above the other, the bezel 18 embracing major portions of the peripheral edges of each of the lenses 17. The bezel 18 is held together at substantially its central portion by a nut and bolt 20 and 21 respectively passing through oppositely aligned apertures therein. The head of bolt 21 may also anchor an apertured U-shaped bracket 22 to the signal device 16 for supporting the staff of the warning flag, if desired.

As stated above, the signal device 16 is swingable in relation to the supporting base 11. To this end, an upper hinge portion 23 and a lower hinge portion 24 are provided which are secured together for hinging action by a journal pin 25. The upper hinge portion 23 is preferably channel-shaped and has a laterally extending slot 26 extending through its central web to accommodate the free lower ends of the bezel 18 which embraces the lenses 17. The free ends of the bezel are also held in place by the journal pin 25.

The lower second hinge portion or upright extension 24 is also preferably channel-shaped and affords a mounting portion for the signal device 16. Upwardly extending legs 27 of the extension 24 are preferably spaced laterally to make a close fit with the downwardly extending legs 30 of the first hinge portion. The journal pin 25 passes through the adjacent pairs of leg members to hold the hinge structure in operative relationship.

The central web of the lower hinge portion 24 may be provided with a pair of downwardly extending rivets 32. As can best be seen in FIGS. 7, 8 and 10, the shank of the rivets 32 protrude downwardly through the base slot 13, and the head of the rivets 32 make a close fit with the marginal edge portions of the base around the slot 13 to afford fore and aft stability to the mounting portion or extensions 24.

This structure enables the hinge portions 23, 24 and the signal device 16 to be moved longitudinally of the base 11. Thus, when the warning signal is in retracted inoperative position (FIG. 2), the hinge portions 23, 24 are moved to the forward end of the base 11 so that the signal device 16 can be swung downwardly adjacent the base and a number of the highway warning signals may be stacked together if desired. To place the signal device 16 in forward extended position, the signal device is simply swung 180° from retracted inoperative position (FIG. 2) to a position as shown in FIG. 6, and the base can be impaled in mud or snow to support the signal device 16 in signaling position. When it is desired to place the signal device 16 in upright signaling position, the signal device 16 is swung 90° from its position in FIG. 2 to a position shown in FIG. 3, and then the signal device 16 is moved longitudinally in the slot 13 to a position centrally of the base, as shown in dotted outline in FIG. 3.

In order to positively latch the signal device 16 in each one of the three positions described above, latch means are provided between the relatively movable portions of the signal device 16 and the base 11. As best shown in FIGS. 7–10, a transverse latching bar 33 extends between the spaced legs 30 of the hinge portion 23 and passes through oblate slots 34 in the legs. The latching bar 33 is continuously urged toward corresponding ends of the slot 34 by a U-shaped spring 35 which embraces and is secured at one end to the journal pin 25 and at its other end to the medial portion of the latching bar 33. In other words, the U-shaped spring 35 tends to pinch the latching bar 33 and the journal pin 25 toward each other. It should also be noted that ample clearances are cut away in the free end of the bezel 18, for example, see slots 36 in FIG. 7, so that the ends of the bezel 18 do not interfere with the movement of the latching bar 33.

Figure 2:
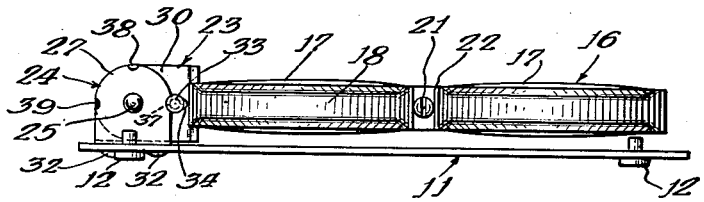
FIG. 2 is a side elevational view of the device shown in FIG. 1.

The upwardly extending legs 27 of the second hinge portion 24 are each preferably rounded at their upper free end as best shown in FIGS. 2 and 9. It is preferred that these upper ends be formed on a radius about the journal pin 25, and that latching notches or detents 37, 38 and 39 be spaced at 90° intervals about the periphery of the upper end of the legs 27.

Thus, the latching bar 33 is continuously urged in its slots 34 toward the journal pin 25. During the swinging movement of the signal device 16, the latching bar 33 is cammed upwardly out of the detents 37, 38 or 39 and rides on a guide track formed on the rounded periphery of the upper end of the legs 27. When the latching bar is moved to a position opposite one pair of the latching notches 37, 38 and 39, it simply snaps into that pair of notches to positively hold and to give lateral stability to the signal device in that latched position. Added force on the signal device 16 will overcome the action of the U-shaped spring 35 on the latching bar 33 and cam the latching bar 33 upwardly out of the notch again for movement along the periphery of the legs 27 to another latched position.

The foregoing detailed description is given for clearness of understanding only and no unnecessary limitations should be understood therefrom for some modifications will be obvious to those skilled in the art.

I claim:

1. A foldable warning signal, comprising: a supporting base provided with a mounting portion slidable thereon; a signal device swingably secured to said mounting portion for movement from an inoperative position adjacent the base to a signaling position, said signal device being slidable with the mounting portion on the base to any one of a plurality of signaling positions disposed longitudinally of said base; and cooperating latching members on the mounting portion and the signal device for latching said signal device in each of said signaling positions.

2. A foldable warning signal as specified in claim 1, in which one of said latching members is movable and is spring-urged toward latching engagement with the other latching member.

3. A foldable warning signal, as specified in claim 1, in which the latching member on the signal device is movable and is spring-urged toward latching engagement with the other latching member.

4. A foldable warning signal as specified in claim 1 in which the mounting portion has an upright extension provided with arcuately disposed latching detents and the latching member on the signal device is movable and spring-urged toward latching engagement with said latching detents, said detents and latching member being positioned to releasably latch the signal device in inoperative position, in upright signaling position and in forward extended signaling position.

5. A foldable warning signal, comprising: a supporting base provided with a pair of laterally spaced upright extensions each having corresponding arcuately spaced latching detents; a signal device provided with a journal pin to swingably mount said signal device for movement from an inoperative position to a signaling position; a latching bar movably mounted on the signal device for latching said signaling device in inoperative and in signaling position, said latchng bar being positoned so that its opposite ends may be moved into latching engagement with corresponding pairs of latching detents on the extensions; and spring means operative between said journal pin and said latching bar to normally urge said latching bar toward latching engagement with said detents.

6. A foldable warning signal, as specified in claim 5 in which the extensions are slidably mounted on the supporting base for movement longitudinally thereof and the detents and latching bar are positioned to latch the signal device in inoperative position, in upright signaling position and in forward extended signaling position.

7. A foldable warning signal, comprising: a supporting base provided with an upright extension; a signal device swingably secured to said base for movement from a retracted inoperative position adjacent the base through an upright signaling position to a forward extended signaling position; and cooperating latching members on the upright extension and the signal device for selectively latching said signal device in either of said signaling positions, one of said latching members being movable and being spring-urged toward latching engagement with each of the other latching members.

8. A foldable warning signal comprising: a support base provided with an upright extension; a signal device swingably secured to said base for movement from an inoperative position to a signaling position; cooperating latching members on the upright extension and the signal device for latching the signal device in inoperative position and in signaling position, one of the latching members including a plurality of arcuately spaced latching notches and the other of the latching members including a radially movable portion adapted selectively to engage said notches in signaling and in inoperative positions; and spring means normally urging said radially movable portion toward latching engagement with each of said notches.

9. A foldable warning signal as specified in claim 8, in which the upright extension is slidable on the base whereby the signal device may be adjusted longitudinally of the base when in signaling position.

References Cited in the file of this patent
UNITED STATES PATENTS

| | | |
|---|---|---|
| 751,290 | Jaeger | Feb. 2, 1904 |
| 1,262,712 | Stone | Apr. 16, 1918 |
| 2,679,370 | Bolser | May 25, 1954 |
| 2,995,325 | Gunderson | Aug. 8, 1961 |